US011304414B2

(12) United States Patent
Chang et al.

(10) Patent No.: US 11,304,414 B2
(45) Date of Patent: Apr. 19, 2022

(54) INSECT-TRAPPING DEVICE AND ITS COUNTING METHOD

(71) Applicant: Quanta Computer Inc., Taoyuan (TW)

(72) Inventors: Jung-Wen Chang, Taoyuan (TW); Chin-Kang Chang, Taoyuan (TW); Chao-Ching Huang, Taoyuan (TW); Ming-Yu Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 15 days.

(21) Appl. No.: 16/836,531

(22) Filed: Mar. 31, 2020

(65) Prior Publication Data

US 2021/0153492 A1 May 27, 2021

(30) Foreign Application Priority Data

Nov. 27, 2019 (TW) ................................. 108143265

(51) Int. Cl.
*A01M 1/02* (2006.01)
*A01M 1/04* (2006.01)
*G06M 1/272* (2006.01)

(52) U.S. Cl.
CPC .............. *A01M 1/04* (2013.01); *A01M 1/026* (2013.01); *G06M 1/272* (2013.01); *A01M 2200/01* (2013.01)

(58) Field of Classification Search
CPC .............................. A01M 1/026; G06M 1/272
See application file for complete search history.

(56) References Cited

U.S. PATENT DOCUMENTS

| 2,997,806 | A | * | 8/1961 | Duvall | A01M 1/02 43/121 |
| 4,411,094 | A | * | 10/1983 | Spackova | A01M 1/02 43/111 |
| 4,423,564 | A | * | 1/1984 | Davies | A01M 1/14 43/121 |
| 4,914,854 | A | * | 4/1990 | Zhou | A01M 1/103 43/112 |
| 5,133,150 | A | * | 7/1992 | Briese | A01M 1/026 43/122 |
| 5,646,404 | A | * | 7/1997 | Litzkow | A01M 1/026 250/338.1 |

(Continued)

FOREIGN PATENT DOCUMENTS

CN 105454189 A * 4/2016
CN 105660565 A * 6/2016

(Continued)

*Primary Examiner* — Peter M Poon
*Assistant Examiner* — Morgan T Barlow
(74) *Attorney, Agent, or Firm* — Rabin & Berdo, P.C.

(57) ABSTRACT

An insect-trapping device includes a container, a funnel element, two photo interrupters and a controller. The container has an inlet and an accommodation space. The funnel element is placed on the inlet to extend into the accommodation space of the container. The photo interrupters are arranged within an inner passage of the funnel element along a long axis direction of the inner passage for sensing whether at least one insect passes through the inner passage from the inlet. The controller is electrically connected to the photo interrupters for counting the insects passing through the inner passage according to the photo interrupters.

4 Claims, 5 Drawing Sheets

(56) References Cited

U.S. PATENT DOCUMENTS

| | | | | |
|---|---|---|---|---|
| 5,926,997 A * | 7/1999 | Wilcox | | A01M 1/026 43/60 |
| 6,161,327 A * | 12/2000 | Thomas | | A01M 1/145 43/114 |
| 6,393,760 B1 * | 5/2002 | Lingren | | A01N 31/14 43/122 |
| 6,478,440 B1 * | 11/2002 | Jaworski | | F21V 33/0004 362/96 |
| 6,564,503 B1 * | 5/2003 | Miyahara | | A01M 1/026 43/112 |
| 6,729,552 B1 * | 5/2004 | McEwen | | A61L 9/037 239/49 |
| 7,071,829 B2 * | 7/2006 | Gardner, Jr. | | A01M 1/026 250/221 |
| 7,441,368 B1 * | 10/2008 | Rieger | | A01M 1/026 43/139 |
| 7,509,770 B2 * | 3/2009 | Gardner, Jr. | | A01M 1/026 43/107 |
| 10,694,733 B2 * | 6/2020 | Willcox | | A01M 1/04 |
| 2003/0070348 A1 * | 4/2003 | Spragins | | A01M 1/2055 43/121 |
| 2003/0218543 A1 * | 11/2003 | Gardner, Jr. | | A01M 1/026 340/573.2 |
| 2006/0215885 A1 * | 9/2006 | Kates | | A01M 1/026 382/120 |
| 2007/0169401 A1 * | 7/2007 | Chyun | | A01M 1/145 43/113 |
| 2008/0069401 A1 * | 3/2008 | Kates | | A01M 1/026 382/103 |
| 2009/0192763 A1 * | 7/2009 | Gardner, Jr. | | A01M 31/002 702/187 |
| 2009/0199457 A1 * | 8/2009 | Grigorov | | A01M 1/026 43/99 |
| 2011/0196548 A1 * | 8/2011 | Potter | | A01M 1/2094 700/300 |
| 2013/0250116 A1 * | 9/2013 | Oppenheimer | | H04Q 9/00 348/152 |
| 2014/0283435 A1 * | 9/2014 | Galeb | | A01M 1/00 43/107 |
| 2015/0216158 A1 * | 8/2015 | Mizrach | | A01M 1/106 43/107 |
| 2015/0234049 A1 * | 8/2015 | Weber-Grabau | | G01N 21/00 356/72 |
| 2015/0237844 A1 * | 8/2015 | Ribiere-Tharaud | | A01M 1/04 43/107 |
| 2016/0127694 A1 * | 5/2016 | Chang | | A01M 31/002 348/143 |
| 2016/0206286 A1 * | 7/2016 | Roeder | | A01M 1/026 |
| 2016/0245916 A1 * | 8/2016 | Weber-Grabau | | G01B 11/08 |
| 2017/0238521 A1 * | 8/2017 | Flint | | A01M 1/026 |
| 2018/0042211 A1 * | 2/2018 | Zamboni | | A01M 1/023 |
| 2018/0206473 A1 * | 7/2018 | Massaro | | A01M 1/106 |
| 2018/0279598 A1 * | 10/2018 | Hur | | A01M 1/106 |
| 2019/0121302 A1 * | 4/2019 | Reid | | A01M 1/20 |
| 2019/0187281 A1 * | 6/2019 | Weber-Grabau | | G01V 8/20 |
| 2019/0261775 A1 * | 8/2019 | Sarimaa | | A01M 1/04 |
| 2019/0289840 A1 * | 9/2019 | Kaye | | A01M 23/00 |
| 2020/0093113 A1 * | 3/2020 | Liu | | G06K 9/2036 |
| 2020/0093115 A1 * | 3/2020 | Files | | G06F 1/3206 |
| 2020/0229420 A1 * | 7/2020 | Ben Hamozeg | | A01M 1/026 |
| 2020/0404897 A1 * | 12/2020 | Lillamand | | A01M 1/026 |
| 2021/0029983 A1 * | 2/2021 | Deering | | G06Q 40/12 |

FOREIGN PATENT DOCUMENTS

| | | | | |
|---|---|---|---|---|
| CN | 107223649 A | * | 10/2017 | |
| CN | 206978490 U | | 2/2018 | |
| CN | 108040986 A | * | 5/2018 | |
| CN | 108143265 A | * | 6/2018 | |
| CN | 108717566 A | * | 10/2018 | A01M 1/026 |
| CN | 108925526 A | * | 12/2018 | A01M 1/226 |
| CN | 110089506 A | * | 8/2019 | |
| CN | 110221350 A | * | 9/2019 | A01M 1/20 |
| CN | 112088850 A | * | 12/2020 | |
| CN | 112106684 A | * | 12/2020 | G06K 9/46 |
| EP | 1477061 A1 | * | 11/2004 | A01M 1/026 |
| JP | 2008104444 A | * | 5/2008 | A01M 1/226 |
| KR | 20100054331 A | * | 5/2010 | |
| WO | WO-2016064735 A1 | * | 4/2016 | G16H 50/80 |
| WO | WO-2016093673 A1 | * | 6/2016 | G06K 9/46 |
| WO | WO-2017212112 A1 | * | 12/2017 | A47C 19/024 |
| WO | WO-2019130698 A1 | * | 7/2019 | A01M 1/20 |
| WO | WO-2019170996 A1 | * | 9/2019 | G01N 15/10 |

\* cited by examiner

INSECT-TRAPPING DEVICE AND ITS COUNTING METHOD

RELATED APPLICATIONS

This application claims priority to Taiwan Application Serial Number 108143265, filed Nov. 27, 2019, which is herein incorporated by reference.

BACKGROUND

Field of Disclosure

The disclosure relates to an insect-trapping device. More particularly, the disclosure relates to an insect-trapping device and its counting method.

Description of Related Art

To protect crops from insect pests, common methods, for example pesticide-spraying are used. However, overly pesticide-spraying not only leads cost increment, but also raises several problems of excessive pesticide remained in crops. Therefore, the current countermeasures need to count the total number of insects in the field as a basis for adjusting the spraying pesticide dose.

However, in order to ensure that the spraying amount of pesticide can accurately control the remaining insects, the total number of insects in the field needs more effective and accurate solutions.

SUMMARY

One aspect of the present disclosure is to provide an insect-trapping device and its counting method, to solve the aforementioned problems of the prior art.

In one embodiment of the disclosure, an insect-trapping device includes a container, a funnel element, a photo interrupter and a controller. The container is formed with an inlet and an accommodation space connected to the inlet. The funnel element is with light-absorbed color, placed on the inlet, and inserting into the accommodation space. The funnel element is formed with an inner passage therein. The first photo interrupter is located within the inner passage for sensing whether at least one of insects passes through the inner passage from the inlet. The controller is electrically connected to the first photo interrupter for counting the insects passing through the inner passage according to the sensing of the first photo interrupter.

In another embodiment of the disclosure, a counting method of an insect-trapping device includes steps as follows. A first photo interrupter is enabled to perform light-sensing in a funnel element of the insect-trapping device. A determination is made as to whether any light reflection of an object in the funnel element is sensed by the first photo interrupter. When it is determined that the light reflection of the object in the funnel element is sensed by the first photo interrupter, a determination is made as to whether the light intensity of the light reflection of the object is greater than a threshold value. When it is determined that the light intensity of the light reflection of the object is greater than the threshold value, a controller of the insect-trapping device is enabled to count the object.

Thus, through the construction of the embodiments above, the disclosure can provide an effective and accurate solution for counting the total number of insects thereby ensuring that the spraying amount of pesticide can accurately control the remaining insects.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
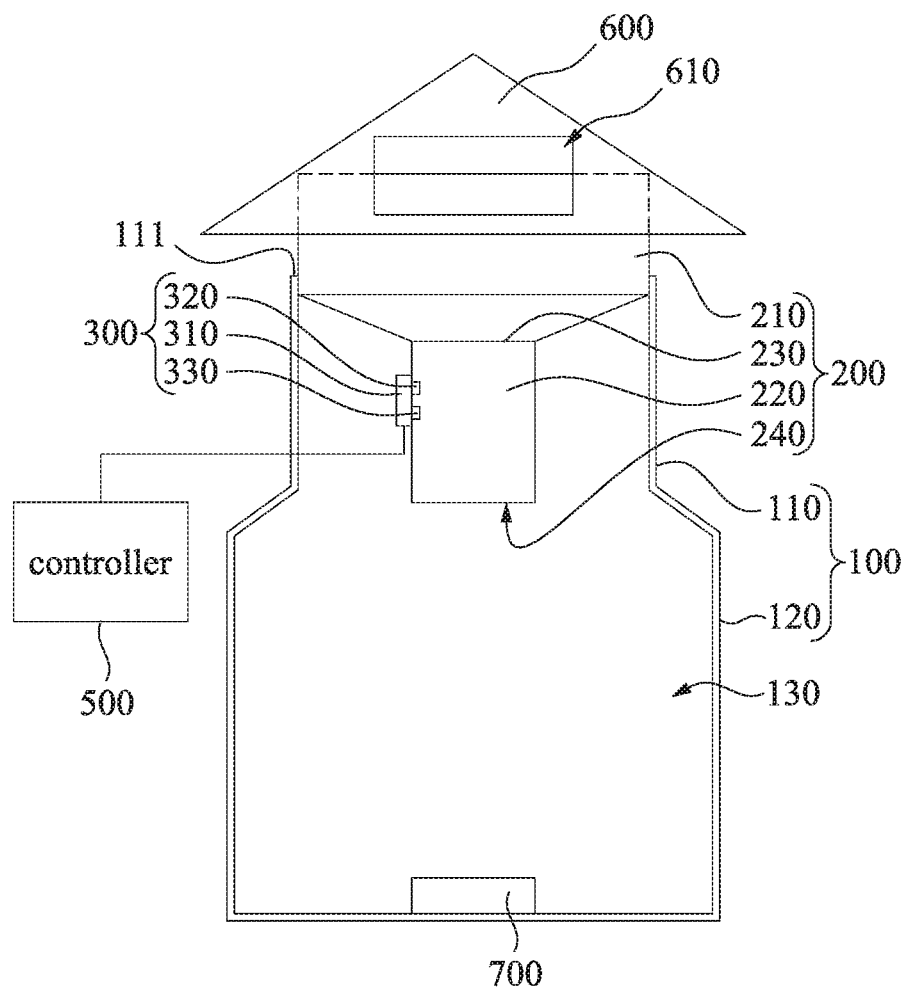
FIG. 1 is a schematic view of an insect-trapping device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
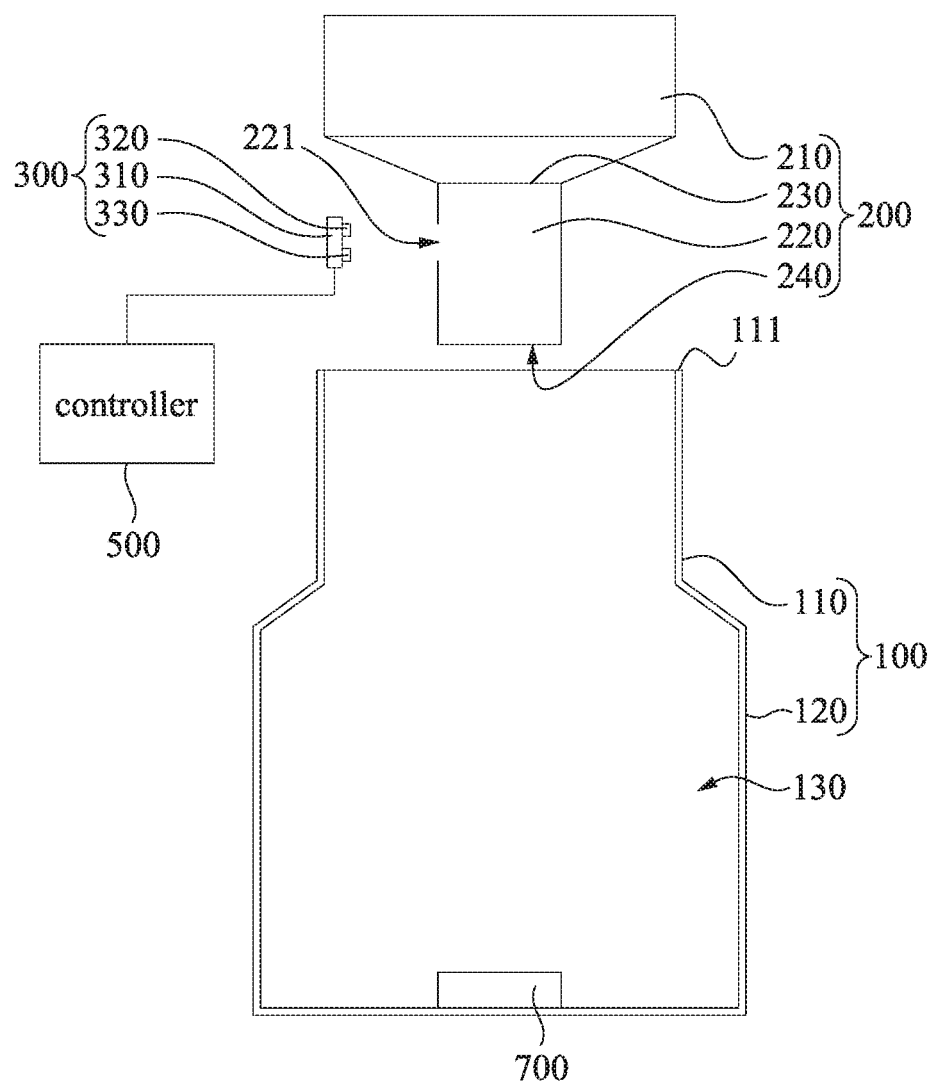
FIG. 2 is an exploded view of the insect-trapping device of FIG. 1.

Reference is now made to FIG. 1 and FIG. 2, in which FIG. 1 is a schematic view of an insect-trapping device 10 according to one embodiment of the disclosure, and FIG. 2 is an exploded view of the insect-trapping device 10 of FIG. 1. As shown in FIG. 1 and FIG. 2, in this embodiment, the insect-trapping device 10 includes a container 100, a funnel element 200, a first photo interrupter 300 and a controller 500. The container 100 has an inlet 111 and an accommodation space 130. The inlet 111 is located on the top of the container 100, and the accommodation space 130 is formed in the container 100, and connected to the inlet 111 for receiving insects. For example but not for limitation, the aforementioned container 100 may be a jar or a bottle, and the aforementioned container 100 includes a containing body 120 and a neck 110 connected to each other, and the neck 110 is narrower than the containing body 120, and the inlet 111 is formed at one end of the neck 110 opposite to the containing body 120, and is the only opening of the container 100. The funnel element 200 is of a dark color, and the funnel element 200 is inserted into the accommodation space 130, and the funnel element 200 has an inner passage 240 therein. For example, the funnel element 200 is made of black plastic to reduce internal light reflections. The first photo interrupter 300 is located within the inner passage 240 of the funnel element 200 to sense whether at least one insect passes through the inner passage 240. The controller 500 is electrically connected to the first photo interrupter 300 to count (i.e., adding up) the number of the insects passing through the inner passage 240 according to the sensing of the first photo interrupter 300. The controller 500 sends the counting value to an external device. The external device for example, is a notebook computer or a cloud server.

However, the disclosure is not limited thereto, in other embodiments, the entire inner wall of the inner passage 240 of the funnel element 200 is coated with a light-absorbing coating layer.

For example, the funnel element 200 includes an enlarged portion 210, a narrow tube 220 and a stopper portion 230. The enlarged portion 210 is hung on the inlet 111 located at the top of the container 100. The narrow tube 220 is formed in a diameter-reducing shape with respect to the enlarged portion 210, and the narrow tube 220 is narrowed inward to be slight. The narrow tube 220 is connected to the enlarged portion 210 and extends into the container 100. One side of the narrow tube 220 has a first opening 221 that is communication with the inner passage 240 of the funnel element 200. The stopper portion 230 is located between the enlarged portion 210 and the narrow tube 220 for preventing the insects in the container 100 from escaping to the enlarged portion 210 from the narrow tube 220. It is noted, the aforementioned inner passage 240 is formed inside the narrow tube 220, the stopper portion 230 and the enlarged portion 210 together.

In this embodiment, the first photo interrupter 300 includes a first plate 310, a first light emitting diode 320, and a first photodiode 330. The first plate 310 is located on the side of the narrow tube 220 to cover the first opening 221. The first light emitting diode 320 is located on the first plate 310 and extends into the inner passage 240 through the first opening 221 for emitting lights in the inner passage 240. The first photodiode 330 is located on the first plate 310 and extends into the inner passage 240 through the first opening 221 for sensing the lights in the inner passage 240. For example, the first light emitting diode 320 and the first photodiode 330 are integrally packaged in an integrated device.

Thus, if there is just no insect passing through the inner passage 240, and when the first light emitting diode 320 emits lights towards the inner wall of the other side of the narrow tube 220 in the inner passage 240, the lights emitted by the first light emitting diode 320 can be roughly absorbed by the inner wall of the funnel element 200 so that the first photodiode 330 cannot sense, or can only sense minor light-reflection; on the other hand, if an insect is passing through the inner passage 240, and when the first light emitting diode 320 emits lights towards the inner wall of the other side of the narrow tube 220 in the inner passage 240, the light reflected by the insect can be sensed by the first photodiode 330.

In addition, the insect-trapping device 10 further includes a top cover 600. The top cover 600 is placed on the top of the enlarged portion 210 of the funnel element 200 and the container 100. The top cover 600 has a window 610, which is aligned with the enlarged portion 210 of the funnel element 200, and connected to the inner passage 240 of the funnel element 200 to allow insects to enter the inner passage 240 of the funnel element 200 from the window 610.

Furthermore, the insect-trapping device 10 further includes an insect attracting element 700. The insect attracting element 700 is placed within the accommodation space 130 to attract insects into the container 100. The insect attracting element 700 is, for example, a light source or a hormone.

Figure 3:
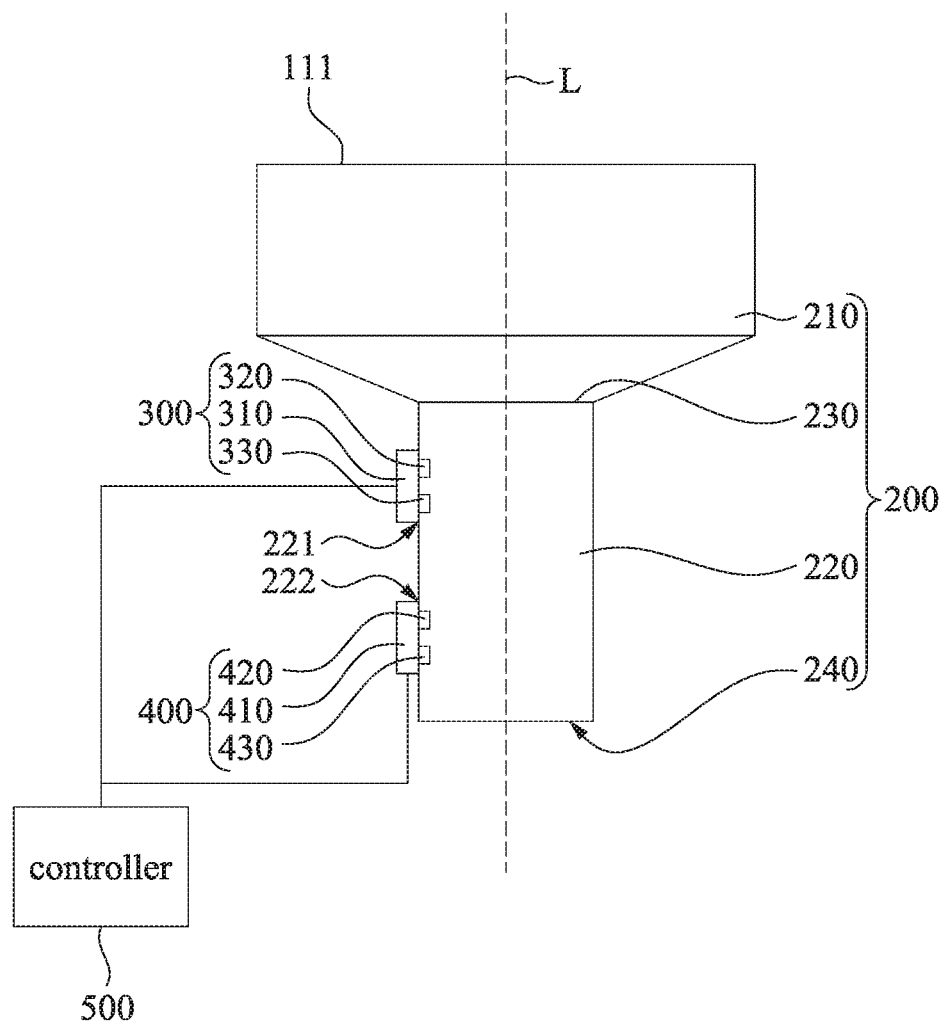
FIG. 3 is a schematic view of a funnel element and photo interrupters according to one embodiment of the disclosure.

FIG. 3 is a schematic view of a funnel element 200 and photo interrupters 300, 400 according to one embodiment of the disclosure. As shown in FIG. 3, the insect-trapping device 10 further includes a second photo interrupter 400. The second photo interrupter 400 is electrically connected to the controller 500, and located within the inner passage 240. The first photo interrupter 300 and the second photo interrupter 400 are respectively spaced arranged in the inner passage 240 along a long axis direction L of the inner passage 240 of the funnel element 200. The second photo interrupter 400 is used to sense whether the insect passes through the inner passage 240 from the inlet 111. Since the insects may float back and forth in front of the first photo interrupter 300, a misjudgment of repeated counting may be happened. Thus, in the embodiment, the controller 500 is instructed to count (i.e., add up or plus one) the number of the insects passing through the inner passage 240 only when both of the first photo interrupter 300 and the second photo interrupter 400 sense that insect.

More specifically, the one side of the narrow tube 220 has a second opening 222 that is in communication with the inner passage 240. The first opening 221 and the second opening 222 are respectively spaced arranged along the long axis direction L of the inner passage 240.

The second photo interrupter 400 includes a second plate 410, a second light emitting diode 420, and a second photodiode 430. The second plate 410 is located on the side of the narrow tube 220 to cover the second opening 222. The second light emitting diode 420 is located on the second plate 410 and extends into the inner passage 240 through the second opening 222 for emitting lights in the inner passage 240. The second photodiode 430 is located on the second plate 410 and extends into the inner passage 240 through the second opening 222 for sensing the lights in the inner passage 240. For example, the second light emitting diode 420 and the second photodiode 430 are integrally packaged in an integrated device.

Thus, if there is just no insect passing through the inner passage 240, and when the second light emitting diode 420 emits lights towards the inner wall of the other side of the narrow tube 220 in the inner passage 240, the lights emitted by the second light emitting diode 420 can be roughly absorbed by the inner wall of the funnel element 200 so that the second photodiode 430 cannot sense, or can only sense minor light-reflection; on the other hand, if an insect is passing through the inner passage 240, and when the second light emitting diode 420 emits lights towards the inner wall of the other side of the narrow tube 220 in the inner passage 240, the light reflected by the insect can be sensed by the second photodiode 430.

It is noted, the controller 500 is not limited to be connected to the first photo interrupter 300 and the second photo interrupter 400 by wire or wirelessly.

Figure 4:
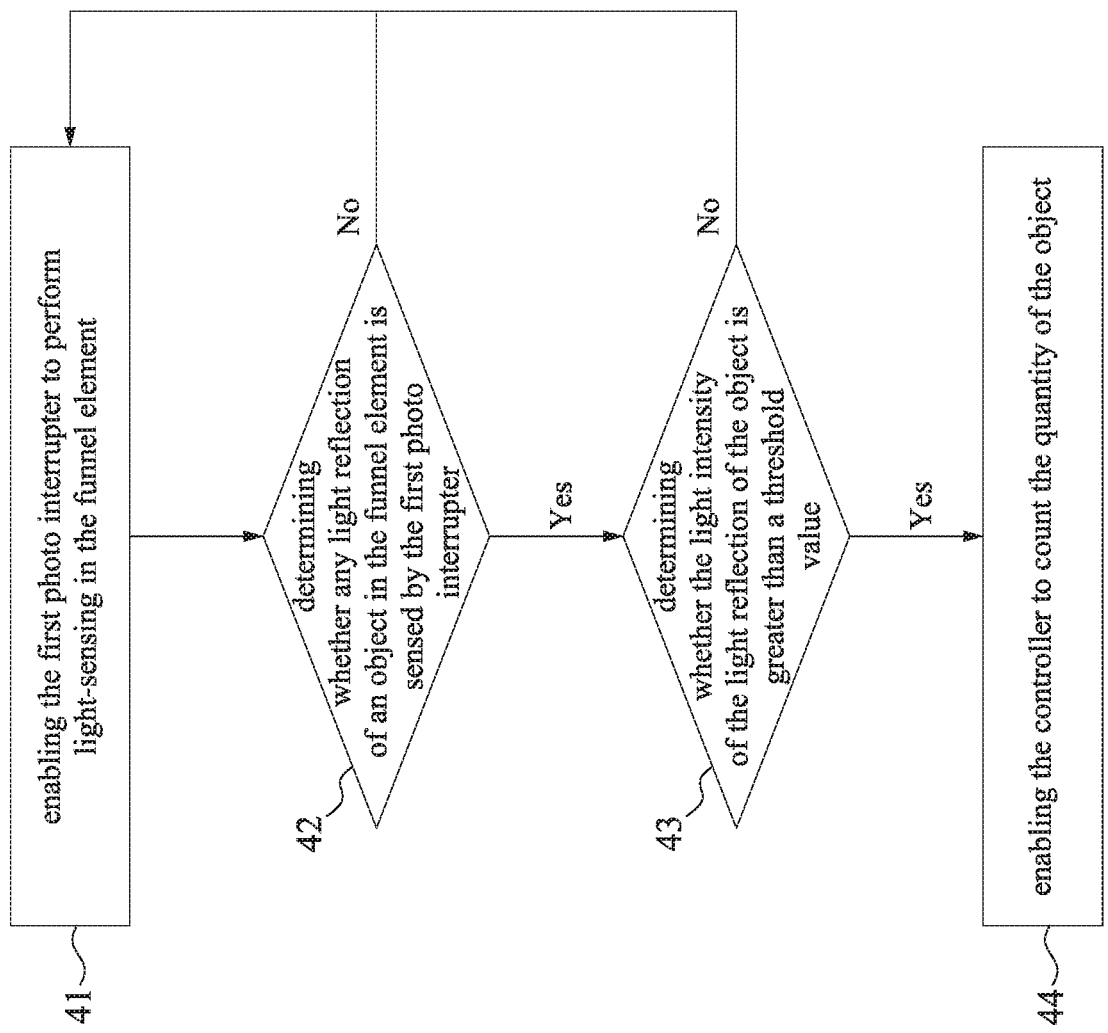
FIG. 4 is a flow chart of a counting method of an insect-trapping device according to one embodiment of the disclosure.

FIG. 4 is a flow chart of a counting method of an insect-trapping device 10 according to one embodiment of the disclosure. As shown in FIG. 1 and FIG. 4, the counting method of the aforementioned insect-trapping device 10 includes Step 41 to Step 44 as follows. In Step 41, the first photo interrupter 300 is enabled to perform light-sensing in the funnel element 200. In Step 42, a determination is made as to whether any light reflection of an object (e.g., insect) in the funnel element 200 is sensed by the first photo interrupter 300. If so, go to Step 43, otherwise back to Step 41. In Step 43, a determination is made as to whether the light intensity of the light reflection of the object (e.g., insect) is greater than a threshold value (e.g., default value). If so, go to Step 44, otherwise back to Step 41. In Step 44, the controller 500 is enabled to count the quantity of the object (e.g., insect), that is, to add up the current value by one.

More specifically, before Step 43 is performed, the counting method further includes several steps as follows. When no object passes through the inner passage 240 of the funnel element 200, the first photo interrupter 300 senses a first light value; when an object passes through the inner passage 240 of the funnel element 200, the first photo interrupter 300 senses a second light value that is greater than the first light value, and then the threshold value is set between the first light value and the second light value.

Figure 5:
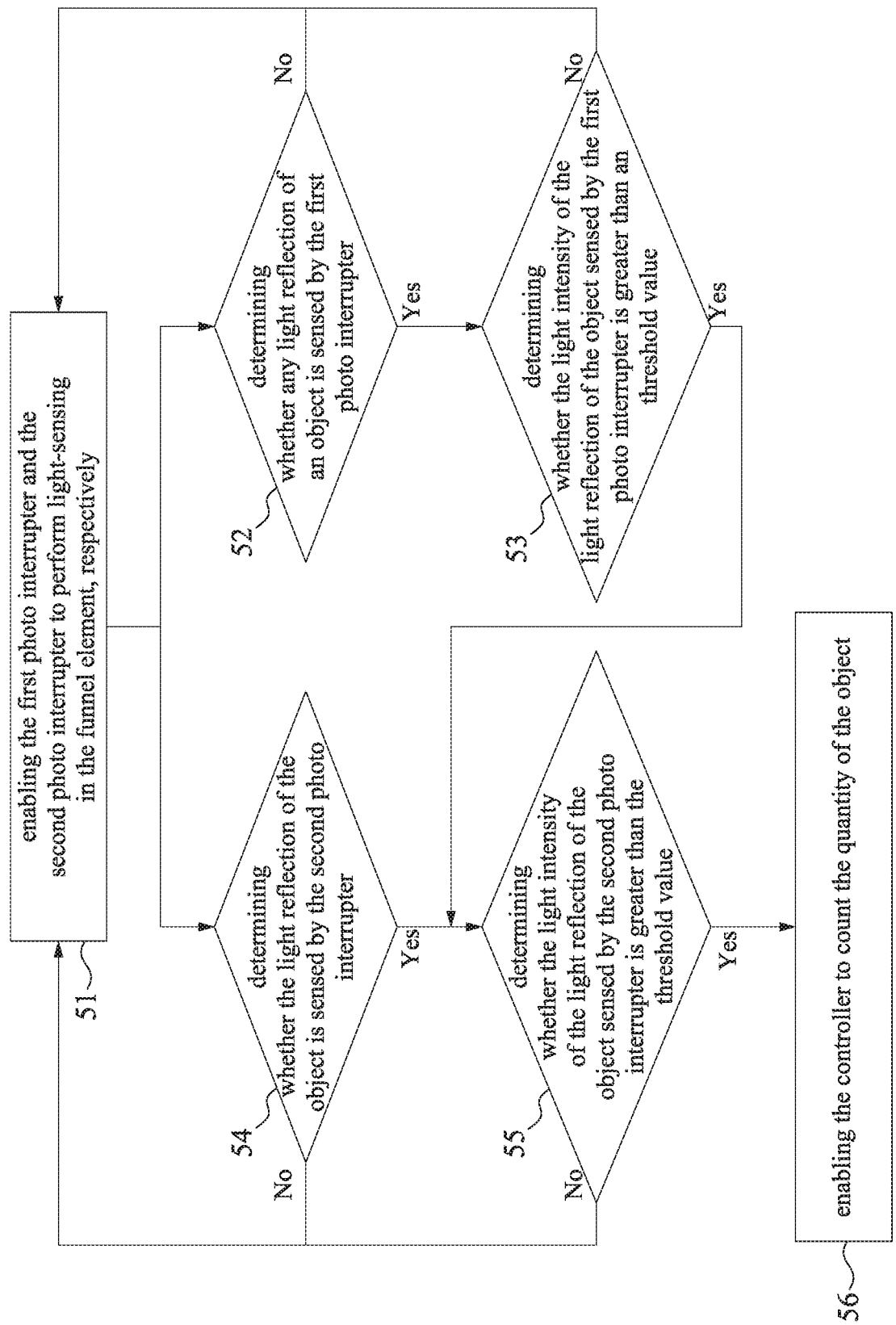
FIG. 5 is a flow chart of a counting method of an insect-trapping device according to one embodiment of the disclosure.

FIG. 5 is a flow chart of a counting method of an insect-trapping device 10 according to one embodiment of the disclosure. As shown in FIG. 1 and FIG. 5, the counting method of the aforementioned insect-trapping device 10 includes Step 51 to Step 56 as follows. In Step 51, the first photo interrupter 300 and the second photo interrupter 400 are respectively enabled to perform light-sensing in the funnel element 200, go to Step 52 and Step 54. In Step 52, a determination is made as to whether any light reflection of an object (e.g., insect) in the funnel element 200 is sensed by the first photo interrupter 300, if so, go to Step 53, otherwise go to Step 51. In Step 53, a determination is made as to whether the light intensity of the light reflection of the object (e.g., insect) sensed by the first photo interrupter 300 in the funnel element 200 is greater than the aforementioned threshold value (e.g., default value). If so, go to Step 54, otherwise back to Step 51. In Step 54, a determination is made as to whether any light reflection of the object (e.g., insect) in the funnel element 200 is sensed by the second photo interrupter 400, if so, go to Step 55, otherwise go to Step 51. In Step 55, a determination is made as to whether the light intensity of the light reflection of the object (e.g., insect) sensed by the second photo interrupter 400 is greater than the aforementioned threshold value (e.g., default value). In Step 56, when it is determined that the light intensity of the light reflection of the object (e.g., insect) sensed by both of the first photo interrupter 300 and the second photo interrupter 400 is greater than the aforementioned threshold value (e.g., default value), the controller 500 is enabled to count the quantity of the object (e.g., insect), that is, to add up the current value by one.

Furthermore, in this embodiment, in order to prevent the light emission of the first photo interrupter 300 and the second photo interrupter 400 from interfering with each other, the controller 500 controls a light-emitting timing (i.e., emitting sequence) of the first light emitting diode 320 and a light-emitting timing (i.e., emitting sequence) of the second light emitting diode 420 to be interleaved with each other. In other words, the first light emitting diode 320 of the first photo interrupter 300 is enabled to emit lights according to a first light-emitting timing of the first light emitting diode 320, and the second light emitting diode 420 of the second photo interrupter 400 is enabled to emit lights according to a second light-emitting timing of the second light emitting diode 420. The first light-emitting timing of the first light emitting diode 320 and the second light-emitting timing of the second light emitting diode 420 are different and are interleaved with each other. Therefore, the first photodiode 330 and the second photodiode 430 can only receive the corresponding reflected light.

Thus, through the construction of the embodiments above, the disclosure can provide an effective and accurate solution for counting the total number of insects thereby ensuring that the spraying amount of pesticide can accurately control the remaining insects.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An insect-trapping device, comprising:
    a container having an inlet and an accommodation space connected to the inlet;
    a funnel element of a dark color, placed on the inlet, and inserted into the accommodation space, the funnel element having an inner passage therein, wherein the funnel element includes an enlarged portion and a narrow tube, the enlarged portion being hung on the inlet, and the narrow tube being connected to the enlarged portion, and extending into the container;
    a first photo interrupter that is located within the inner passage and is configured to sense whether at least one insect passes through the inner passage;
    a second photo interrupter that is located within the inner passage under the first photo interrupter, and is configured to sense whether the at least one insect passes through the inner passage, wherein the first photo interrupter and the second photo interrupter are spaced apart and arranged along an axis direction of the inner passage; and
    a controller that is electrically connected to the first photo interrupter and the second photo interrupter, and is configured to count the at least one insect passing through the inner passage only when both of the first photo interrupter and the second photo interrupter sense the at least one insect.

2. The insect-trapping device of claim 1, wherein one side of the narrow tube has a first opening that is in communication with the inner passage; and
    the first photo interrupter comprises:
    a first plate that is disposed on the one side of the narrow tube;
    a first light emitting diode that is disposed on the first plate, and extends into the inner passage through the first opening, the first light emitting diode being configured to emit lights in the inner passage; and
    a first photodiode that is disposed on the first plate, and extends into the inner passage through the first opening, the first photodiode being configured to sense the lights in the inner passage.

3. The insect-trapping device of claim 2, further comprising:
    a second plate that is disposed on the one side of the narrow tube, wherein the one side of the narrow tube further has a second opening that is in communication with the inner passage, and the first opening and the second opening are respectively spaced arranged along a long axis direction of the inner passage;
    a second light emitting diode that is disposed on the second plate, and extends into the inner passage through the second opening, the second light emitting diode being configured to emit lights in the inner passage; and a second photodiode that is disposed on the second plate, and extends into the inner passage through the second opening, the second photodiode being configured to sense the lights in the inner passage.

4. The insect-trapping device of claim 3, wherein the controller controls a light-emitting timing of the first light emitting diode and a light-emitting timing of the second light emitting diode to be interleaved with each other.

\* \* \* \* \*